United States Patent
Loepfe

[15] 3,676,769
[45] July 11, 1972

[54] METHOD AND APPARATUS FOR DETECTING A RELATIVE MOVEMENT BETWEEN TWO BODIES BEING IN FRICTIONAL CONTACT WITH EACH OTHER

[72] Inventor: Erich Loepfe, Zollikerberg, Switzerland
[73] Assignee: Aktiengesellschaft Loepfe, Zurich, Switzerland
[22] Filed: June 13, 1969
[21] Appl. No.: 833,030

[30] Foreign Application Priority Data

June 17, 1968 Switzerland..........................9225/68
Oct. 24, 1968 Switzerland........................16038/68
April 30, 1969 Switzerland..........................6679/69

[52] U.S. Cl..................................324/32, 28/64, 324/72
[51] Int. Cl............................................G01r 29/12
[58] Field of Search................324/32, 72, 109, 54; 28/64

[56] References Cited

UNITED STATES PATENTS

| | | | |
|---|---|---|---|
| 2,189,352 | 2/1940 | Siegenheim | 324/32 |
| 2,663,842 | 12/1953 | Graham | 324/32 |
| 2,872,638 | 2/1959 | Jones | 324/9 X |
| 2,964,828 | 12/1960 | Sharps | 28/64 |
| 3,013,203 | 12/1961 | Allen et al | 324/109 X |
| 3,465,242 | 9/1969 | Gruetzmacher et al. | 324/54 |

FOREIGN PATENTS OR APPLICATIONS

368,877  6/1963  Switzerland..........................317/2 A

*Primary Examiner*—Gerard R. Strecker
*Attorney*—Morgan, Finnegan, Durham & Pine

[57] ABSTRACT

An apparatus is provided for determining a relative movement between two bodies wherein the movement causes a sliding friction between the bodies. The friction causes changes in electrical charges in the friction zone. An electrical conductor is located within the operative range of these changes. The conductor is connected with a device amplifying and further processing the potential fluctuations of the conductor occurring during the relative movement which is to be determined.

13 Claims, 11 Drawing Figures

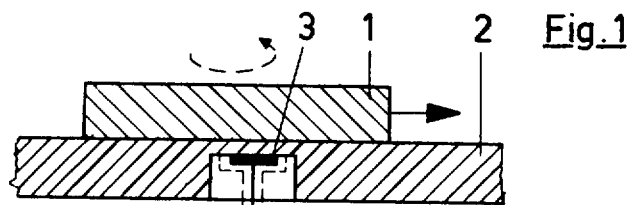
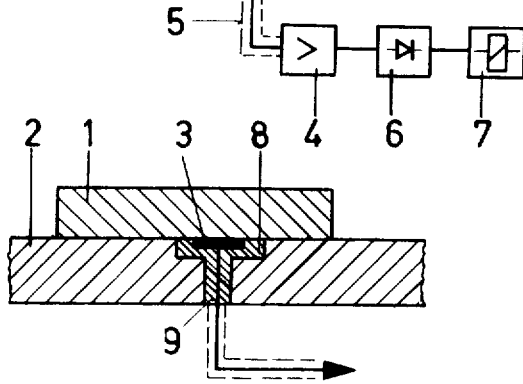
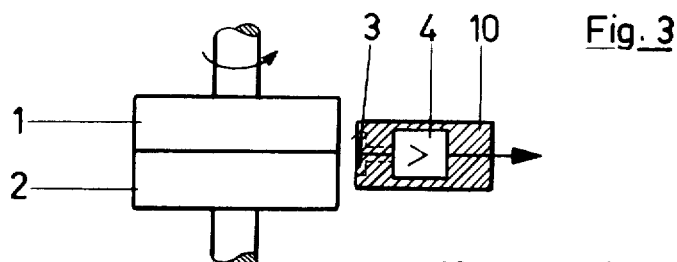
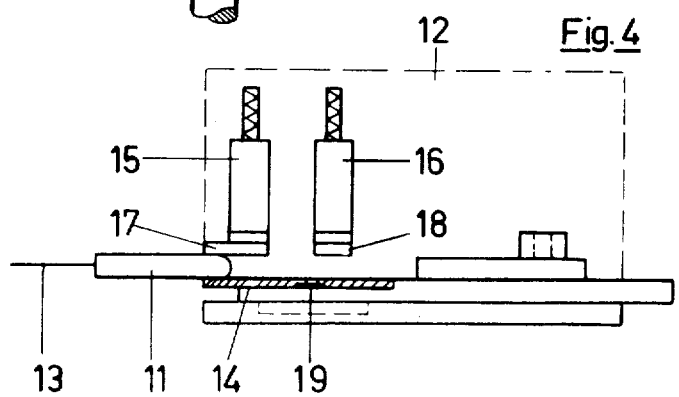
ERICH LOEPFE
INVENTOR.
BY Richards & Geier
ATTORNEYS

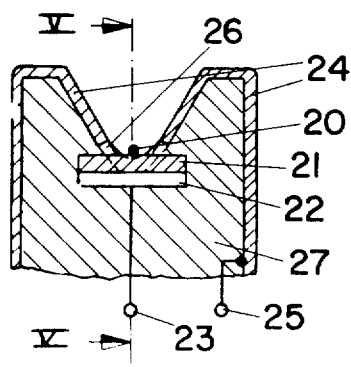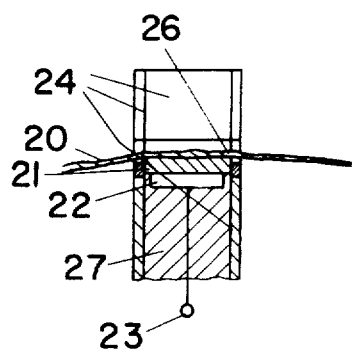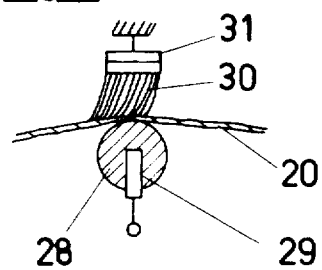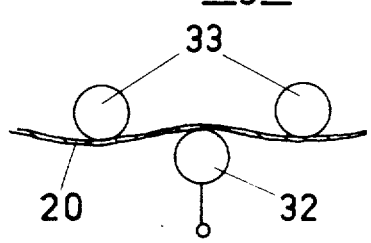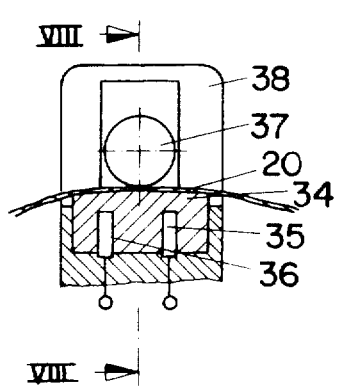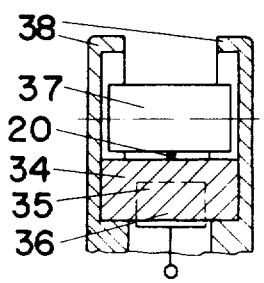

3,676,769

METHOD AND APPARATUS FOR DETECTING A RELATIVE MOVEMENT BETWEEN TWO BODIES BEING IN FRICTIONAL CONTACT WITH EACH OTHER

This invention relates to a device for determining a relative movement between two bodies, the movement causing a sliding friction.

Such a relative movement, wherein a sliding friction is produced between two bodies can take place, for example, between a movable part of a machine and the lining of a brake which engages this movable part, the considered movement taking place precisely during the braking operation. By determining this movement, namely, the part of the whole movement which is combined with friction, it is possible to obtain a time image of the braking operation.

Another example pertains to the sliding movement, usually undesired, between two bodies normally held together by adhering friction, which takes place when the adhering friction changes into sliding friction.

A further example is that of the movement of a textile yarn in a textile machine. There the yarn is conducted over thread guides against which it rubs. The determination of the relative movement of the yarn with respect to such a guiding element constructed as a sensing device, produces a criterium for the correct movement of the yarn, and is used particularly to determine whether the yarn is broken or lost.

Devices for measuring the speed of the relative movement between two bodies are generally known. They contain a sensing device which transforms a condition change related to the movement into a measurable value. These sensing devices used for the task of speed measurements, are complicated and expensive devices which are mostly adapted for only one specific use and which are bound to specific requirements concerning the characteristics of at least one of the bodies. Thus known speed sensors are hardly adapted for the task of only determining a motion.

In the art of monitoring the movement of a textile yarn, devices are already known which are provided with a feeler element engaging the yarn which oscillates due to the yarn movement, particularly due to unevenness of the yarn surface. These oscillations are converted into an electrical signal by the use of a mechanical-electrical transducer, for example, a piezoelectrical transducer, the presence of the signal indicating the relative movement between the thread and the feeler.

These devices primarily have the drawback that mechanical feelers and transducers having adequate sensitivity for the movement being determined, such as the movement of a thin textile yarn, are all very sensitive with respect to mechanical disturbing influences which take place in machines in the form of vibrations and other percussions.

An object of the present invention is to provide a device for determining a relative movement between two frictionally engaged bodies which will be as simple as possible in construction, secure in its operation, namely, particularly insensitive with respect to disturbing influences and to a great extent independent from the material and the physical characteristics of the two bodies.

Further objects of the present invention are the provision of a device having a high precision, in the milliseconds range, for the determination of the time limits of a movement interval, and the determination of a movement within a very short observation interval, located also in the range of milliseconds.

Other objects of the present invention will become apparent in the course of the following specification.

In the accomplishment of the objectives of the present invention it was found desirable to provide an electrical conductor located in the operative range of electrical charge changes produced by friction, the conductor being connected with a device amplifying and further processing the potential fluctuations of the conductor during the relative movement which is being determined.

The invention will appear more clearly from the following detailed description when taken in connection with the accompanying drawings, showing, by way of example only, preferred embodiments of the inventive idea.

In the drawings:

FIG. 1 is a diagrammatic sectional view of a device for determining a relative movement with a conductor located in one of the two bodies;

FIG. 2 is similar to FIG. 1 but shows a different embodiment;

FIG. 3 is a diagram illustrating the arrangement of the measuring probe outside of the rubbing bodies;

FIG. 4 is a diagram showing a shuttle braking device in a weaving machine with gripper shuttles;

FIG. 5 is a section along the line V—V of FIG. 5a showing a yarn motion monitor;

FIG. 5a is a transverse section of the device shown in FIG. 5;

FIG. 6 is a sectional view of a different sensing device;

FIG. 7 is a diagram illustrating yet another yarn sensing device;

FIG. 8 is a section along the line VIII—VIII of FIG. 8a, showing a yarn monitor with two separate conductors;

FIG. 8a is a transverse section of the device shown in FIG. 8.

Figure 1A:
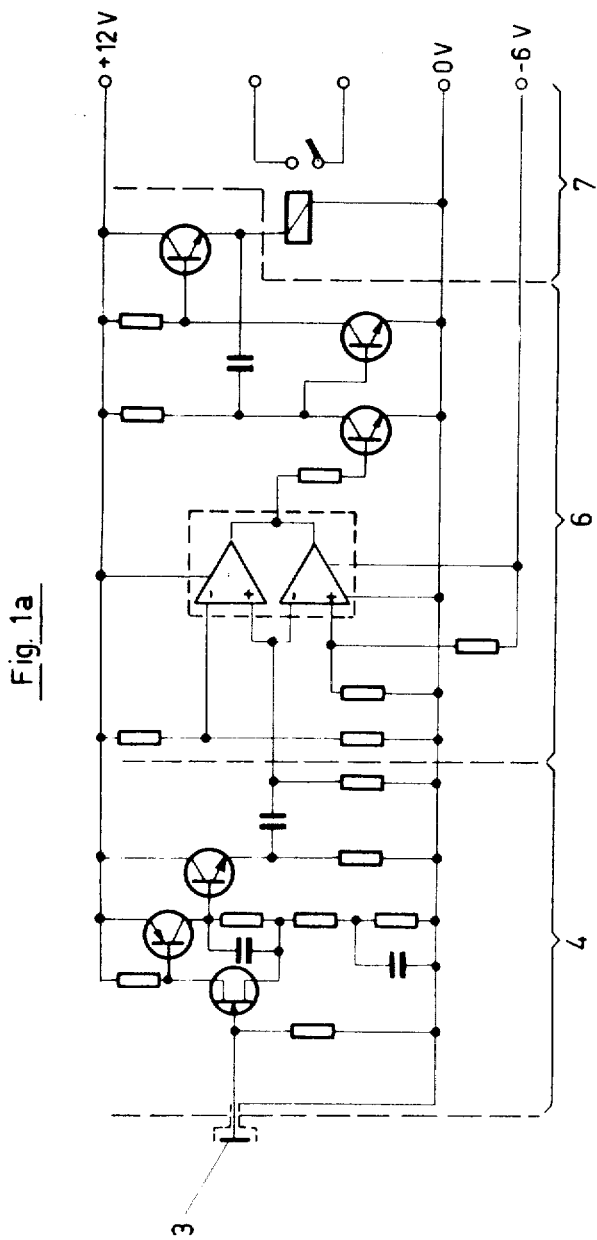
FIG. 1a is a circuit diagram of the device amplifying and further processing the potential fluctuations of the said conductor.

FIG. 1 shows two bodies 1 and 2 which engage each other. The body 2 consists of an electrically insulating material, while the body 1 can have any desired electrical properties. An electrical conductor having the shape of a thin small copper plate 3 is located within the body 2 at a distance from the surface of contact of the two bodies which amounts to about one millimeter. The surface of the plate 3 directed to the body 1 can have the size of one square centimeter, for example; the plate 3 is electrically connected with the input of an amplifier 4, the input impedance of which is in the megohm range. The plate 3, except for its sensing surface, and the conductor connecting it to the amplifier 4, are provided with electrical shielding 5. The input stage of the amplifier 4 is preferably provided with a field effect transistor which is particularly suitable for this use due to its low noise level and its high input impedance.

Should the body 1 carry out a movement relative to the body 2, whether it be longitudinal or rotary, in the course of which it frictionally engages the body 2, then random electrical potential fluctuations, a form of noise, are produced in the conductor plate 3. These potential fluctuations are probably caused by quick irregular charge changes which occur in the frictional zone during the movement and which are reproduced in the plate 3 by electrostatic induction. After they have been amplified and after a suitable frequency band has been filtered out of the total fluctuation signal in the stage 4, these fluctuations are transformed into a direct current signal in the stage 6 which is used for actuating an indicating or operating device 7.

FIG. 1a shows more in detail a circuit arrangement in which the potential fluctuations of plate 3 are processed to actuate an operating device 7 formed by a relay. The amplifying and filtering stage 4 is followed by stage 6 which comprises a dual differential comparator (of the type described in the article of R. I. WIDLAR et al., "Optimale Verwendung von analogen integrierten Schaltungen," in "Internationale Elektronische Rundschau," 1967, No. 10, page 249–253, particularly on page 253) and a circuit well-known in the art as Miller integrator. Stage 6 performs the conversion of the amplified fluctuation signal into a d.c. signal feeding the relay of device 7.

The potential fluctuations of the conductor plate 3 have a wide frequency spectrum and from it, for example, a frequency band of about 5–50 kHz is used for the determination of the relative movement. Frequencies in this range provide a high information density and make it possible, even in case of high relative speeds (of some 100 m/min.) to attain a high precision, in the order of milliseconds or less, in the determination of the time limits of the movement, namely, the determination of its start, its duration and its end.

The amplitude of the described potential fluctuations depends primarily on the coefficient of friction, on the material of the bodies being used and on their relative speed.

FIG. 2 illustrates an arrangement in the case where the body 2 consists of an electrically conducting material. Body 2 is provided with a recess 8 extending up to the frictional surface. In the example illustrated, the conductor plate 3 is embedded on one side in an insulating body or mass 9, and is in direct contact with the body 1. In this case charge changes produced in the frictional zone are conducted galvanically from the locations where they were produced.

According to another embodiment, an insulating intermediate layer, consisting, for example, of a ceramic plate, can be placed between the plate 3 and the frictional surface. Then conditions are created which are analogous to those shown in FIG. 1.

FIG. 3 illustrates a construction wherein the two rubbing bodies 1 and 2 consist of rotary discs, whereby the disc 1 can drive the disc 2 by friction. According to another structural example, the disc 2 will stand still or will rotate in the opposite direction. In these cases it may be necessary to determine the beginning of a relative movement between the two discs. A measuring probe 10 is used for this purpose which again contains a conductor plate 3 and is so arranged that this plate is located in the operational range of changes in electrical charges in the frictional zone. The probe contains an amplifier 4, and a further processing device for the fluctuation signal characteristic of the relative movement is located outside the probe, possibly as a central unit for evaluating signals from a group of measuring probes.

FIG. 4 illustrates an example wherein it is necessary to determine the precise moment of ending of the movement of a body which in this example is that of a projectile 11 in the braking device 12 of a weaving machine with gripper shuttles. Information concerning this moment is used to limit the control interval during which the weft yarn 13 inserted by the projectile must be examined. FIG. 4 shows the projectile as it enters the braking device consisting, on one hand, of a brake plate 14 and, on the other hand, of two resiliently mounted brake plungers 15 and 16 provided with brake linings 17 and 18. The brake plate 14 consists of an insulating material and contains a conducting plate 19. (As in the case of body 2 in FIG. 1.) While the projectile moves over this plate 19 in the last part of the braking phase, potential fluctuations are produced in the above-described manner, which are amplified and further processed in the described manner. The disappearance of the fluctuating signal at the moment when the projectile comes to a stop, releases an operating pulse for the device monitoring the weft yarn.

The shape and the dimensions of the electrical conductor which receives the charge changes occurring in the friction zone, are not limited to those set forth in the above examples, but must be selected in each case depending upon the specific required use. It is also possible to use a simple wire or a rounded conductor shape in direct contact or with an insulating intermediate piece. The greatest possible distance of the conductor from the friction zone results from the strength of the electrical field produced by the frictional charges and from the strength of the possibly present electrical disturbing fields. To make these latter as little effective as possible, the input circuit of the first high-ohmic amplifying stage is shielded preferably close to the surface influenced by the friction charges. One of the two rubbing bodies can be used as a measuring probe (similar to the probe 10 shown in FIG. 3), whereby in an extreme case the conductor can be the entire rubbing body, so that it will include the entire frictional surface of one body.

FIGS. 5 and 5a illustrate another example of a feeler for determining the movement of a textile yarn. The yarn 20 can be, for example, the weft yarn of a weaving machine or the yarn wound on a winding frame. This yarn is then one of the two above described rubbing bodies, while the second body is constituted of a small plate 21 of ceramic oxide which is so arranged that the yarn rubs against it during its movement. During this movement, irregular potential fluctuations with a large proportion of high frequencies take place in a conductor 22 provided at the lower side of the plate 21 and also having the shape of a small plate. These fluctuations take place in the same manner as described in connection with FIG. 1. Point 23 is connected to means for amplifying and further processing in a similar way as shown in FIG. 1a. The actual sensing device 21, 22 is located in a casing 24 made of an electrically conducting material which is kept at mass potential through connection 25. The casing consists of two side walls and two cover plates, whereby a thread guide 26 is inserted into each cover-plate. The interior is cast with a potting compound 27. The side walls limit the yarn channel up to close to the friction plate 21 and constitute along with the other parts of the casing, a shielding for the conductor 22. Furthermore, it was found that the potential fluctuations in the conductor 22 are enhanced by the provision in the vicinity of the yarn, particularly on the side of the yarn located opposite the sensing conductor, of a conductor which is held at mass potential or more general at a constant potential. This effect is also utilized in the construction described hereinafter.

In the construction shown in FIG. 6 the sensing device for the yarn 20 consists on one hand of an insulating body 28 and a conductor 29 embedded therein, in which potential fluctuations take place which represent the signal, and, on the other hand, of a brush-like pressing member 30 having a conducting plate 31 which is held at mass potential. The brush 30 produces, not only a good contact between the thread 20 and the friction body 28, but also produces additional charges by the friction between the yarn and the hairs of the brush. This produces very strong potential fluctuations in the conductor 29 even if the yarn is very smooth and also in case of yarns having an extremely high moisture content.

FIG. 7 shows a particularly simple construction of a sensing device which also produces a very clearly differentiated signal. In that case the conductor 32, the potential changes of which are used for monitoring the yarn movement, is itself used as the friction body. The yarn 20 is guided over two guiding members 33 so that yarn tension produces a sufficient pressure applied to the conductor 32.

FIGS. 8 and 8a shows sections through a sensing device with an insulated body 34 containing two separate conducting plates 35 and 36. The thread 20 is drawn taut over this insulated body and is also pressed against it by the weight of a roller 37 which is loosely held in a cage 38. The roller 37 carries out a function similar to that of the brush 30 in FIG. 6.

The use of two conductors 35 and 36 which are arranged one behind the other in the direction of movement of the yarn, is based on the observation that the potential fluctuations produced by the movement of the yarn in these two conductors, do not have any correlation. This is also the case when their distance from each other is quite small, amounting, for example, to 1 millimeter, their distance from the yarn being also about the same.

The creation of these uncorrelated potential fluctuations in the construction of FIG. 8 is used for eliminating disturbing fields. For that purpose the potential fluctuations of the conductors 35 and 36, after being amplified, are conducted to the inputs of a differential amplifier so that disturbing fields which influence the two conductors in the same way, are cancelled and will not produce an output signal. The difference between the two uncorrelated signals then produce a signal indicating the movement of the yarn.

A particular advantage of the apparatus of the present invention consists in that the movement to be determined produces directly an electrical signal. This means that it is not necessary to convert a non-electrical magnitude resulting from the movement into an electrical magnitude. Specifically, the apparatus does not contain any moving mechanical parts and no means producing sensing fields, since the sensing device operates as a passive receiver.

The result is that when the present invention is applied, for example, to the monitoring of textile yarns, the possibility is provided to keep the corresponding sensing device small and very simple. This means that it can be easily applied to all types of textile machines wherein the spread has to be monitored with respect to its longitudinal or transverse movements.

Another advantage of the present invention consists in that the described charge changes due to the nature of their creation have a wide frequency spectrum and appear in substantially all material combinations of the frictional bodies. The application range of the apparatus of the present invention is correspondingly great. More particularly, it extends to cases which require a great precision in the determination of the movement, namely, for example, as far as its moment of appearance, its duration and its ending are concerned, and/or in which the available observation interval is very short. For the monitoring of the movement of textile yarns, the fact that the appearance of the fluctuation signal is to a great extent insensible to material changes, is of particular importance, since often the same processing machine uses simultaneously or successively, threads of greatly different types, such as spun yarns, filaments or monofils, and compositions, such as natural fibers, synthetics, blended yarns and yarns of or with metal components. Of great advantage is also the lack of sensitivity as for the moisture content of the yarn is concerned.

I claim:

1. A method for detecting relative movement between two frictionally contacting bodies, comprising the steps of carrying out a relative movement between the frictionally contacting bodies to transfer electrical charges between said bodies owing to the relative movement therebetween, sensing variations in the electrical charge so transferred, and detecting from the sensed charge changes an electrical noise signal indicative of the relative movement between the bodies and independent of the absolute accumulated charge at each of the bodies.

2. The method set forth in claim 1, further comprising selecting from said electrical noise signal predetermined frequency components and processing said components to form an electrical indicating signal.

3. The method set forth in claim 2, wherein said electrical indicating signal is a direct current signal.

4. The method of claim 2, wherein the selected frequency components are greater than about 1 kilohertz.

5. The method of claim 4, wherein the selected frequency components are in the range between about 5 kilohertz and 50 kilohertz.

6. In a system for detecting relative movement between two frictionally contacting bodies by sensing an electrical charge characteristic generated by such movement, including means responsive to an electrical noise signal representing such characteristic to provide an output signal indicative of such movement, a sensing device comprising a friction body formed of an electrically insulating material and providing a surface adapted for frictional contact with a relatively moving body, and electrically conducting means associated with said friction body for sensing the electrical noise signal indicative of the instantaneous charge changes between the frictionally contacting bodies and independent of the absolute accumulated charge at each thereof, said electrically conducting means including a terminal connection for providing an electrical signal to the signal responsive means.

7. Apparatus for detecting the relative motion of an element comprising a dielectric friction body providing a charge transfer surface to be engaged by the relatively moving element, an electrically conductive member associated with the friction body and disposed to be influenced by the electrical charges produced at such surface by the frictional contact therewith of the moving element and thereby to develop at the conductive member an electrical noise signal, and means responsive to the electrical noise signal for developing an electrical signal independent of the absolute electrical potential of the moving element and indicative of such relative motion.

8. Apparatus in accordance with claim 7, wherein the means responsive to the electrical noise signal includes amplifying means operatively connected with the electrically conducting means and operative to strengthen at least certain frequency components of the electrical noise signal.

9. In a system for detecting relative movement between two frictionally contacting bodies by sensing electrical charge characteristics associated with such movement and including means responsive to an electrical noise signal for developing an output signal indicative of such movement, a sensing device comprising a friction body formed of an electrically insulating material and adapted to be placed in frictional contact with a relatively moving body, electrically conducting means adapted for electrical coupling to the responsive means and associated with said friction body for sensing said electrical noise signal produced by instantaneous charge changes between the frictionally contacting bodies and independent of the absolute accumulated charge at each thereof, and conductive shielding means providing a conductive element in proximity to and electrically isolated from the electrically conducting means for establishing a reference potential therefor.

10. A sensing device in accordance with claim 9, wherein the friction body has a substantially circular cross section, and wherein the electrically conducting means is embedded in the friction body to be isolated from the relatively moving body by a portion of said friction body.

11. A sensing device as claimed in claim 9, wherein the electrically conducting means comprises at least two electrically conducting sensing members embedded in the friction body and mutually spaced and electrically isolated from each other by a portion of such friction body.

12. A sensing device as defined in claim 9, wherein said conductive shielding means forms a casing for at least a portion of friction body and is contoured to provide a surface for guiding the relatively moving body.

13. A sensing device in accordance with claim 9, further comprising yieldable pressure applying means for contacting the relatively moving member and thereby yieldingly urging such member into contact with the friction body.

* * * * *